United States Patent

Kanamaru

[11] Patent Number: 5,205,883
[45] Date of Patent: * Apr. 27, 1993

[54] PNEUMATIC TIRE WITH POLYGONAL BEAD CORE

[75] Inventor: Masahiko Kanamaru, Zushi, Japan

[73] Assignee: The Yokohama Rubber Co., Ltd., Tokyo, Japan

[ * ] Notice: The portion of the term of this patent subsequent to Mar. 12, 2008 has been disclaimed.

[21] Appl. No.: 687,657

[22] Filed: Apr. 19, 1991

Related U.S. Application Data

[63] Continuation-in-part of Ser. No. 493,262, Feb. 26, 1990, abandoned, which is a continuation of Ser. No. 310,168, Feb. 15, 1989, abandoned.

[30] Foreign Application Priority Data

Feb. 23, 1988 [JP] Japan .................................. 63-38628

[51] Int. Cl.⁵ .................................................. B60C 15/04
[52] U.S. Cl. ....................................... 152/540; 245/1.5
[58] Field of Search .................. 152/540, 544; 245/1.5

[56] References Cited

U.S. PATENT DOCUMENTS

| | | | |
|---|---|---|---|
| 4,180,116 | 12/1979 | Maiocchi | 152/540 |
| 4,192,368 | 3/1980 | Maiocchi | 152/540 |
| 4,998,575 | 3/1991 | Kanamaru | 152/540 |

FOREIGN PATENT DOCUMENTS

| | | | |
|---|---|---|---|
| 557915 | 6/1957 | Belgium | 152/540 |
| 2044995 | 3/1972 | Fed. Rep. of Germany | 152/540 |
| 2458923 | 6/1975 | Fed. Rep. of Germany | 152/540 |
| 2591154 | 6/1987 | France | 245/1.5 |

*Primary Examiner*—Geoffrey L. Knable
*Attorney, Agent, or Firm*—Nikaido, Marmelstein, Murray & Oram

[57] ABSTRACT

A pneumatic radial tire having a circular bead core of substantially polygonal cross section which includes a base (a) adjacent an inclined bead base portion of the tire, an inner side (b) on a side of the bead core nearest a bead toe portion of the tire, an outer side (d) on a side of the bead core nearest a bead heel portion of the tire, and a top side (c) opposite the base (a) and joining the inner side (b) and the outer side (d). An inclination $\theta_1$ of the base (a) relative to the axial direction of the tire is substantially the same as that of the bead base portion relative to the axial direction of the tire. A cross angle $\beta$ between the base (a) and the inner side (b) is 70° to 90°. An inclination $\theta_2$ of the top side (c) relative to the axial direction of the tire is smaller than the inclination $\theta_1$ and the direction of inclination of the top side (c) is opposite to that of the base (a).

5 Claims, 9 Drawing Sheets

PNEUMATIC TIRE WITH POLYGONAL BEAD CORE

This application is a continuation in part of application Ser. No. 493,262, filed on Feb. 26 1990, now abandoned as a continuation of application Ser. No. 310,168, filed on Feb. 15, 1989 now abandoned.

BACKGROUND OF THE INVENTION

The present invention relates to a pneumatic tire improved in the rigidity on the bead toe portion side of a bead core, particularly to a heavy-load radial tubeless tire for use in trucks, buses, etc.

A heavy-load radial tubeless tire has a bead portion structure, e.g., as shown in FIG. 4(A). In FIG. 4(A), a carcass layer 2 is turned up around a bead core 1 in a bead portion 10 from the inside of the tire towards the outside of the tire, and a reinforcing layer 3 is provided on the outside of the carcass layer 2. A lower bead filler 4 and an upper bead filler 5 are each provided on the upside (tread side) of the bead core 1, and a reinforcing layer 6 is provided on the outside of a turn-up edge $2u$, the reinforcing layer 3, and the upper filler 5. Numeral 7 designates a bead toe portion, numeral 8 a bead heel portion, and numeral 9 a bead base portion. The bead base portion 9 is inclined at substantially the same angle as that of a rim base portion (not shown) relative to the axial direction E of the tire for the purpose of enhancing the compatibility with a rim.

FIG. 4(B) and FIG. 4(C) are each an example of a bead core. In FIG. 4(B), the bead core 1 has a hexagonal cross section comprising a plurality of bead wires 11 each having a circular cross section, while in FIG. 4(C), the bead core 1 has a rectangular cross section comprising a plurality of bead wires 11 each having a rectangular cross section. The bead cores 1 respectively shown in FIG. 4(B) and FIG. 4(C) are each inclined at substantially the same angle $\alpha$ as that of the rim base portion relative to the axial direction E of the tire.

It is well known that in the above-described tires, a certain kind of tensile force acts on the bead core when the tire is filled with an internal pressure or the tire is rolled under load. In particular, in the case of a radial tire wherein substantially inextensible cords are used as carcass cords for the carcass layer, the carcass cords are provided in the direction normal to the circular bead core. Therefore, as shown by an arrow in FIG. 5(A), the force acting through an internal pressure when the tire is filled with an internal pressure or the tire is rolled under load is conveyed to the bead core 1, so that the force acting in the direction normal to the bead core is larger than that in the case of a bias tire comprising a ply composed of bias laminated carcass cords. In FIG. 5(A), numeral 12 designates a rim and numeral 13 a rim base portion.

In particular, in radial tubeless tires for trucks and buses which are in rapidly increasing demand resulting from an improvement in the express highway in recent years, the internal diameter is smaller than the rim diameter of the rim base portion 13 having an inclination of 15° relative to the axial direction E of the tire for the purpose of hermetic sealing, and the bead base portion 9 is inclined at substantially the same angle as that of the rim base portion 13. For this reason, the bead base portion 9 is compressed from a position shown by a dotted line to a position shown by a solid line. Consequently, as shown in FIG. 5(B), this not only increases the reaction force from the rim 12 remarkably but also causes a large force m to act outward in the radial direction F of the tire.

As a result, during rolling of the tire, the rubber of the bead toe portion 7 is repeatedly deformed under large compression against the rim base portion 13 accompanying the flexing deformation of the bead core 1, which unfavorably brings about a combination of deterioration of the physical properties of the rubber due to the rise of the temperature of the air present within the tire with, as shown by a solid line in FIG. 5(C), an unrecoverable permanent deformation of the rubber of the bead toe portion 7 during a long-term use of the tire. In FIG. 5(C), a dotted line represents the shape of the rubber before running, and a solid line represents the shape of the rubber after running. Further, letter T represents the length of the permanently deformed portion in the axial direction E of the tire, and letter S represents a permanent deformation length in the radial direction of the tire. This kind of deformation occurs in a very narrow range at the top of the bead toe portion 7 in an early stage of the use. However, once the deformation occurs, the area of contact between the bead base portion 9 and the rim base portion 13 is decreased, which brings about an increase in the reaction force of the rim per unit width of the bead base portion 9, so that the deformation further progresses towards the bead heel portion 8.

Thus, the occurrence of the deformation decreases the area of the bead base portion 9 which can be substantially brought into contact with the rim base portion 13. This causes the hermetic sealing of the tire to be spoiled, the injection of air during rim assembling to become difficult, and further vibration to occur due to unstable fit of the bead base portion 9 into the rim base portion 13.

Further, a decrease in the area of contact 25 between the rim base portion 13 and the bead base portion 9 spoils firm fixation of carcass cords under the bead core. This increases the movement of the carcass cords and brings about an increase in the movement of the turn-up edge of the carcass layer, which 5 induces the separation of the edge portion.

In the prior art, in order to eliminate the above-described problems, for example, as shown in FIG. 6, bead wires 11 have been further laminated at the dotted line portion of the bead core 1 to reinforce the bead core 1 without destroying the hexagonal cross section of the bead core 1. However, in this case, the amount of the overhang towards the bead toe side is increased from $W_1$ to $W_2$, which brings about new problems such as an increase in the weight of the bead core 1. In addition, the force acting at a head part of the bead toe portion side of the bead core as shown in FIG. 5(B) is not decreased.

Under the above circumstances, the present inventors have analyzed a number of tires with respect to the deformation of the bead toe portion of the radial tubeless tire and, as a result, have found that in a radial tubeless tire after a long-term use, the initial shape (in a new tire) of the bead core is not retained, that the bead core 1 is deformed as shown by a dotted line in FIG. 7, that the bead toe portion 7 is raised and the inclination of the bead base portion 9 is slightly decreased to approach a horizontal line. Further, the present inventors have made detailed studies on the physical properties of the bead wires of each portion of the bead core of a radial tubeless tire after a long-term used and, as a result, have discovered that as shown in FIG. 8, a lowering in the physical properties of the bead wires on the bead toe portion side is extremely larger than that on the bead core center region and the bead heel portion side (i.e., the index of elongation at breakage of the bead wires on the bead toe side is small and an elastic characteristic thereof is lowered). Further, it has been found that the lowering in the physical properties of the bead wires gradually spreads from the head part region of bead toe portion side towards the bead core center region with an increase in the service period (travel distance) of the tire. For this reason, the present inventors have reached a conclusion that the deformation of the bead toe portion of a radial tubeless tire can be effectively prevented by enhancing the strength and the rigidity of the bead core on the bead toe portion side through an increase in the number of the bead wires provided at the bead core portion on the bead toe portion side.

SUMMARY OF THE INVENTION

The present invention has been made under the above-described circumstances. An object of the present invention is to provide a pneumatic tire which enables suppression of the deformation of the bead toe portion after a long-term use of the tire, prevention of a lowering in the hermetic sealing state, improvement in the injection of air during rim assembling, maintenance of a uniform fit of the tire into a rim, and prevention of occurrence of the separation of the turn-up edge of the carcass layer through an improvement in the rigidity of a bead core on the bead toe portion side.

Accordingly, the present invention relates to a pneumatic radial tire having a circular bead core, wherein said bead core has a substantially polygonal cross section comprising a base a on the side of a bead base portion, an inner side b on the side of a bead toe portion, a top side c on the side of a bead filler, and an outer side d on the side of a bead heel portion, the inclination $\theta_1$ of the base relative to the axial direction of the tire is substantially the same as that of a rim base portion relative to the axial direction of the tire, the cross angle $\beta$ between the base a and the inner side b is 70° to 90°, the inclination $\theta_2$ of the top side c relative to the axial direction of the tire is smaller than the inclination $\theta_1$ and the direction of inclination of the top side c is opposite to that of base a.

DETAILED DESCRIPTION OF THE PREFERRED EMBODIMENTS

Figure 1:
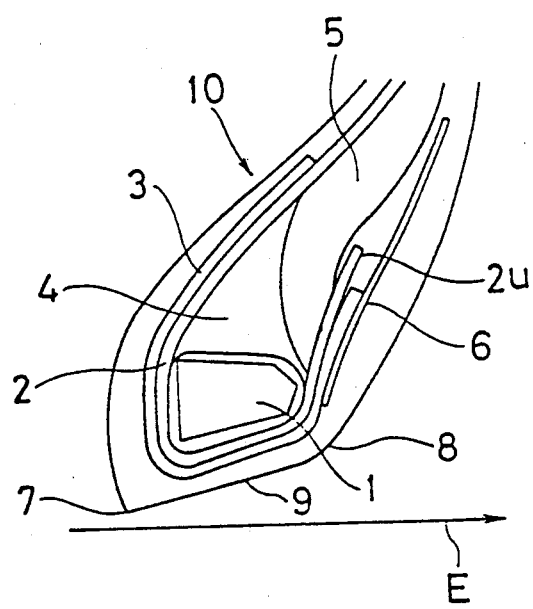
FIG. 1(A) is a cross-sectional view of an example of a bead portion structure of the pneumatic tire according to the present invention.
FIG. 1(B) is a cross-sectional view of the principal part of the bead portion structure shown in FIG. 1(A)
Figure 4:
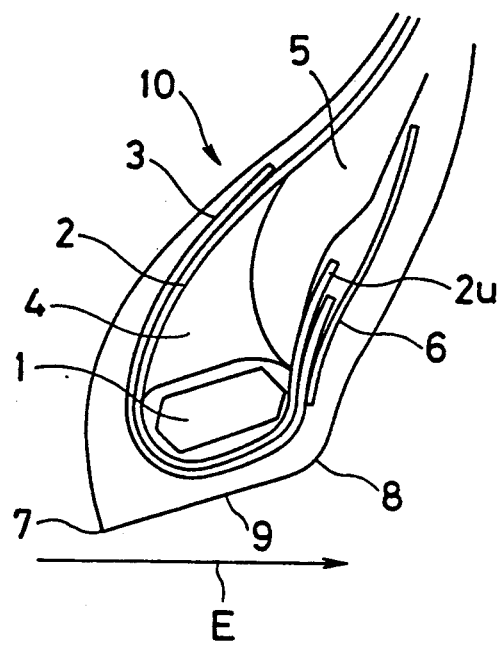
FIG. 4(A) is a cross-sectional view of an example of a bead portion structure of the conventional pneumatic tire.
FIGS. 4(B) and (C) are each a cross-sectional view of a specific example of the bead core shown in FIG. 4(A)
Figure 4:
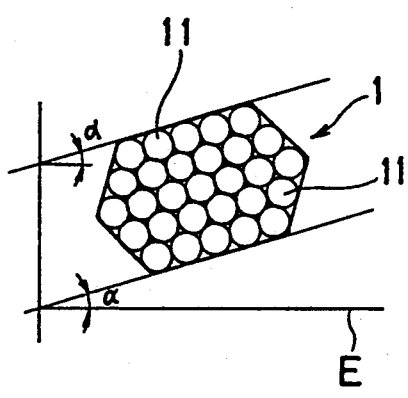
Figure 4:
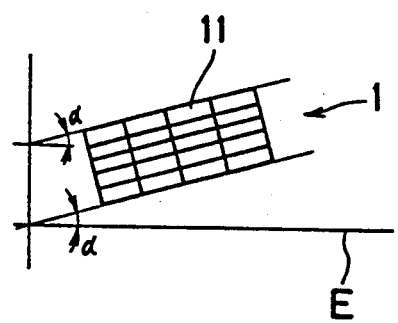

In FIG. 1(A), as with the case shown in FIG. 4(A), a carcass layer 2 is turned up around a bead core 1 in a bead portion 10 from the inside of the tire towards the outside of the tire, and a reinforcing layer 3 is provided on the outside of the carcass layer 2. A lower bead filler 4 and an upper bead filler 5 are each provided on the upper side (tread side) of the bead core 1, and a reinforcing layer 6 is provided on the outside of a turn-up edge 2u, the reinforcing layer 3, and the upper bead filler 5. Numeral 7 designates a bead toe portion, numeral 8 a bead heel portion, and numeral 9 a bead base portion. The bead base portion 9 is inclined at substantially the same angle as that of a rim base portion 13 (see FIG. 1(B)) relative to the axial direction E of the tire for the purpose of improving the fit thereof into the rim base portion 13.

Figure 1B:
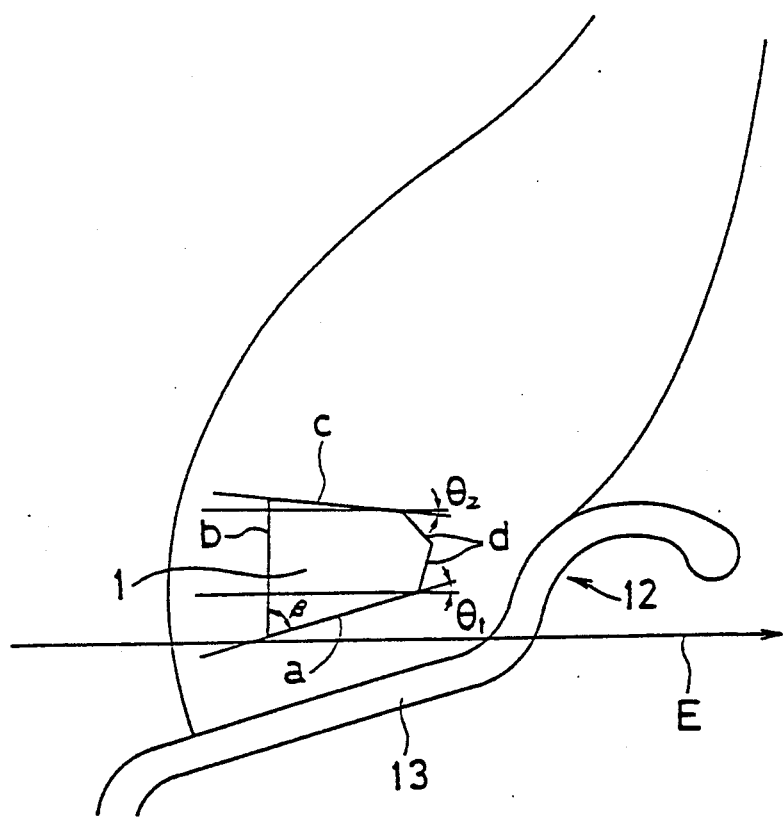

In the present invention, as shown in FIG. 1(B), the bead core 1 has a polygonal cross section comprising a base a on the side of a bead base portion, an inner side b on the side of a bead toe portion, a top side c on the side of a bead filler, and an outer side d on the side of a bead heel portion. The term "cross section" used herein is intended to mean a cross section in a direction perpendicular to the longitudinal direction of the bead core 1.

The inclination $\theta_1$ of the base relative to the axial direction E of the tire is substantially the same as that of the rim base portion 13 relative to the axial direction E of the tire. Specifically, the inclination $\theta_1$ may be 13° to 18°. The cross angle $\beta$ between the base a and the inner side b is 70° to 90°. When the cross angle $\beta$ is less than 70°, the lowest point of the bead core 1 on the bead toe side (an intersection of the base a and the inner side b) is sharp, which brings about a fear of damage to the carcass cords due to the occurrence of rubbing between the carcass cords and the bead core at that portion. On the other hand, when the cross angle $\beta$ exceeds 90°, the amount of the overhang of the upper part of the bead core 1 on the bead toe side is increased, which brings about a lowering in the physical properties of the bead wires provided in this portion. Further, in order to enhance the rigidity of the bead toe portion, the inclination $\theta_2$ of the top side c relative to the axial direction E of the tire is smaller than the inclination $\theta_1$ and the direction of inclination of the top side c is opposite to that of the base a. The inclination of $\theta_2$ is 2° to 10°, preferably 5° to 10°.

Figure 2:
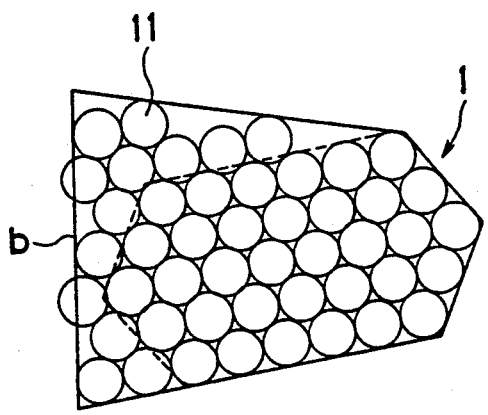
FIGS. 2(A) to (E) are each a cross-sectional view of a specific example of a bead core of the present invention.
Figure 2:
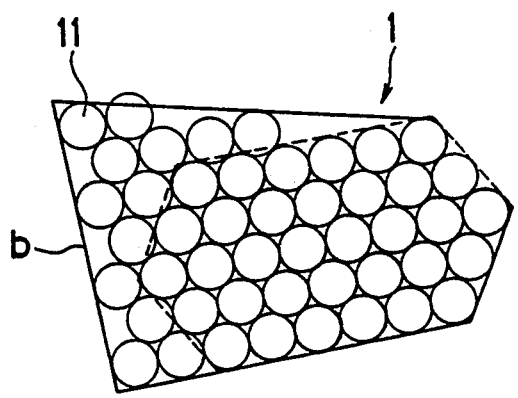
Figure 2:
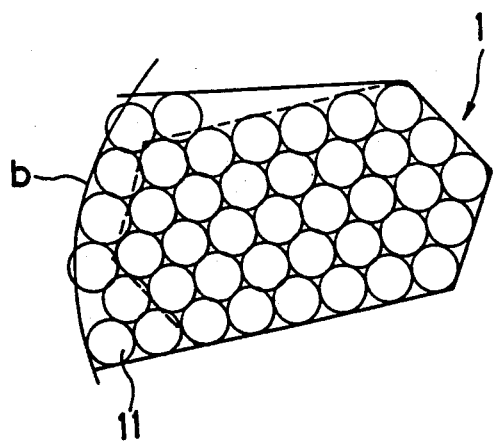
Figure 2:
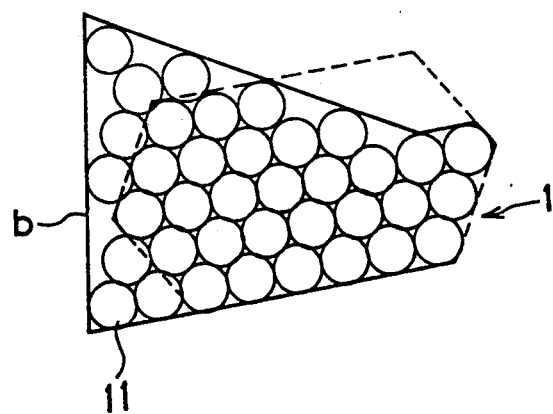
Figure 2:
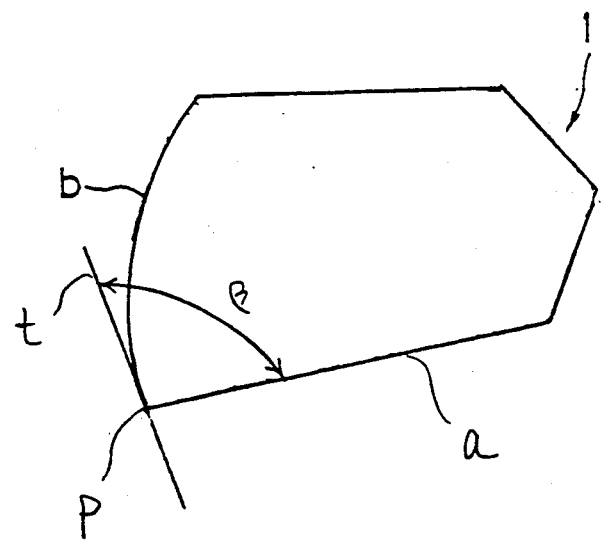

Specific examples of the bead core 1 shown in FIG. 1(B) are shown in FIGS. 2(A) to (E). In these drawings, additional bead wires 11 are provided on the outside of a portion shown by a dotted line with respect to the bead toe portion side of the bead core 1. The inner side b is not necessary a straight line but, as shown in FIG. 2(C), may be a curve which substantially envelops an outer periphery of the bead core 1.

Where the inner side b comprises a curve as shown in FIG. 2(E), the cross angle $\beta$ is the angle taken by the base a and the tangent t on the inner side b (curve) at the point P at which the base a and the inner side b cross each other.

The cross section of the bead wires constituting the bead core may be circular or quadrangular or in any other form. However, it is preferred from the viewpoint of rubbing between each corner portion of the bead core and the carcass cords and productivity of the bead core that the cross section is circular.

The present invention will now be described with reference to the following Example.

EXAMPLE

Figure 3:
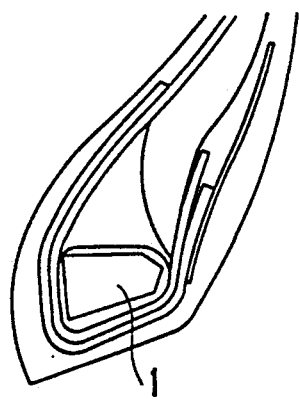
FIGS. 3(A) to (D) are each a cross-sectional view of a specific example of a bead portion structure.
Figure 3:
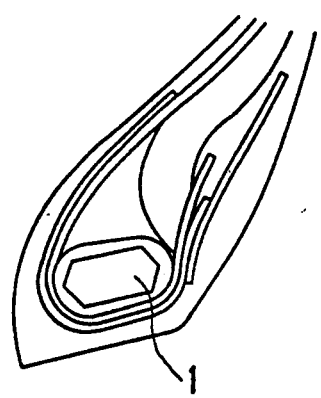
Figure 3:
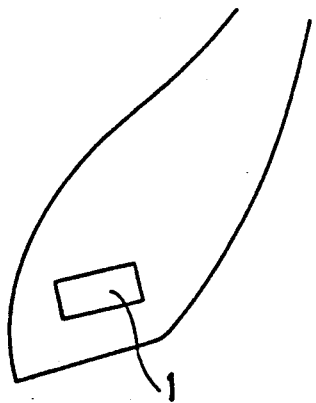
Figure 3:
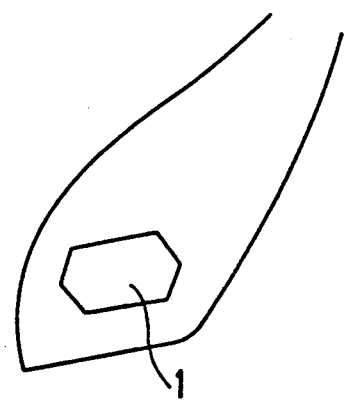
Figure 6:
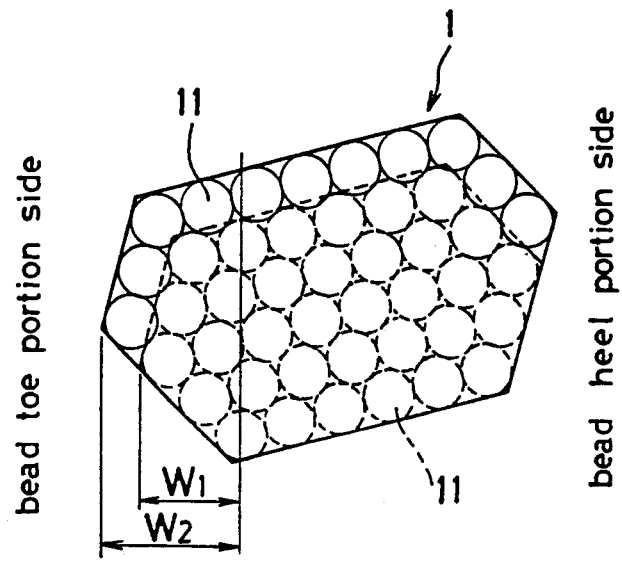
FIG. 6 is a cross-sectional view of another example of a bead core of the conventional pneumatic tire.
Figure 7:
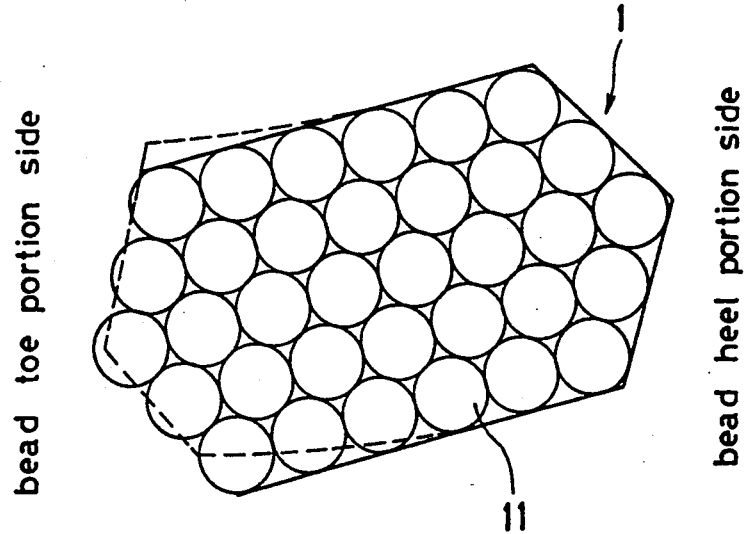
FIG. 7 is a cross-sectional view of the conventional tire showing the deformation of a bead core of the tire after a long-term use.
Figure 8:
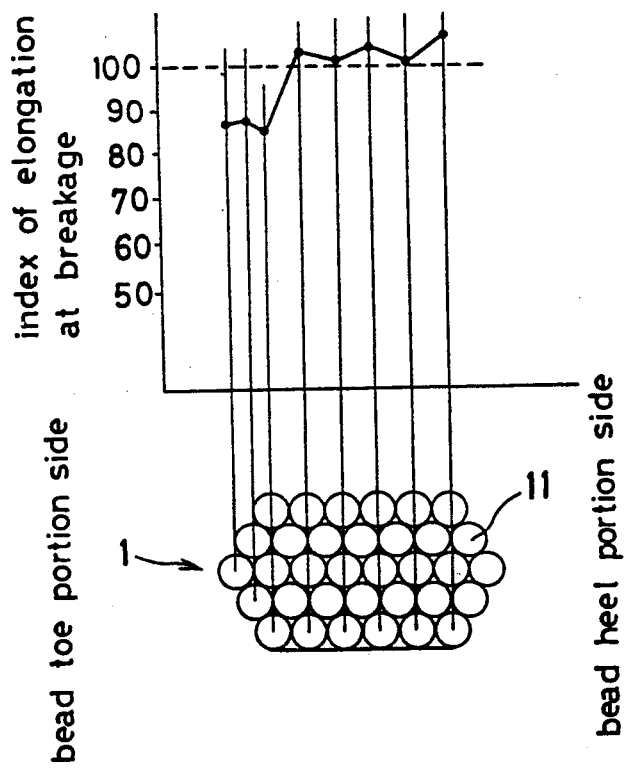
FIG. 8 is a diagram showing the change of physical properties of bead wires in each portion of a bead core of the conventional pneumatic tire after a long-term use.

The following tires were prepared.
(1) Tire of the present invention:
tire size: 11R 22.5 14PR
bead portion structure: shown in FIG. 3(A)
FIG. 3(A) is substantially the same as FIG. 1(A).
$\beta = 80°$
$\theta_1 = 15°$
$\theta_2 = 10°$
(2) Conventional tire A:
tire size: 11R 22.5 14PR
bead portion structure: shown in FIG. 3(B)
FIG. 3(B) is substantially the same as FIG. 4(A). The structure and tire materials of the other portions were the same as those of the above-described tire of the present invention.
(3) Conventional tire B:
tire size: 11R 22.5 14PR
bead portion structure: shown in FIG. 3(C)
FIG. 3(C) is substantially the same as FIG. 3(B), except that the bead core 1 has a rectangular cross section. The structure and tire materials of the other portions were the same as those of the above-described tire of the present invention.
(4) Comparative Tire A:
tire size: 11R 22.5 14PR
bead portion structure: shown in FIG. 3(D)
As described above, a tire having a bead portion structure shown in FIG. 3(D) corresponds to a conventional bead portion structure shown in FIG. 6 and aims at an improvement in the strength and rigidity of the bead core. The structure and tire materials of the other portions were the same as those of the above-described tire of the present invention.
(5) Comparative tire B:
The same as the above-described tire of the present invention except that the top side c and the base a are inclined in the same direction.

Figure 5:
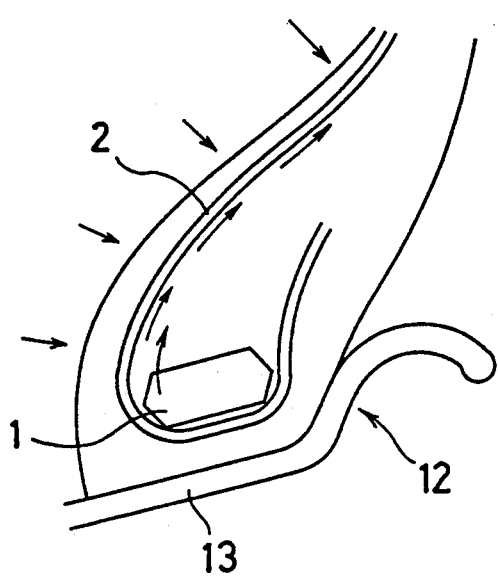
FIGS. 5(A) and (B) are each a cross-sectional view of a bead portion of the conventional pneumatic tire showing the action of force occurred due to an internal pressure on the bead portion.
FIG. 5(C) is a cross-sectional view of the conventional tire showing the deformation of a bead toe portion of the tire after a long-term use.
Figure 5:
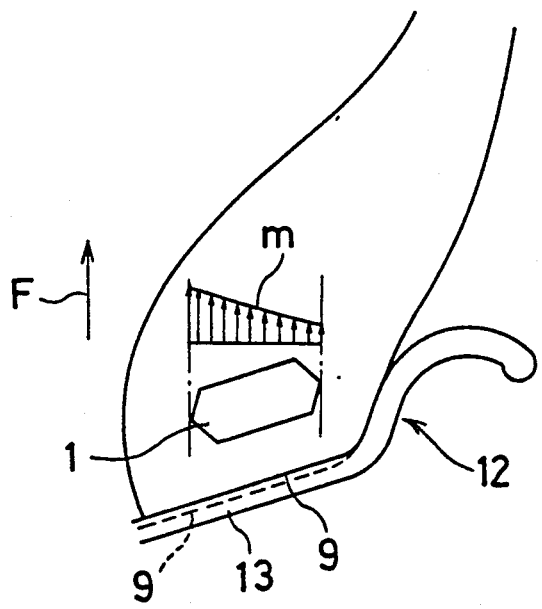
Figure 5:
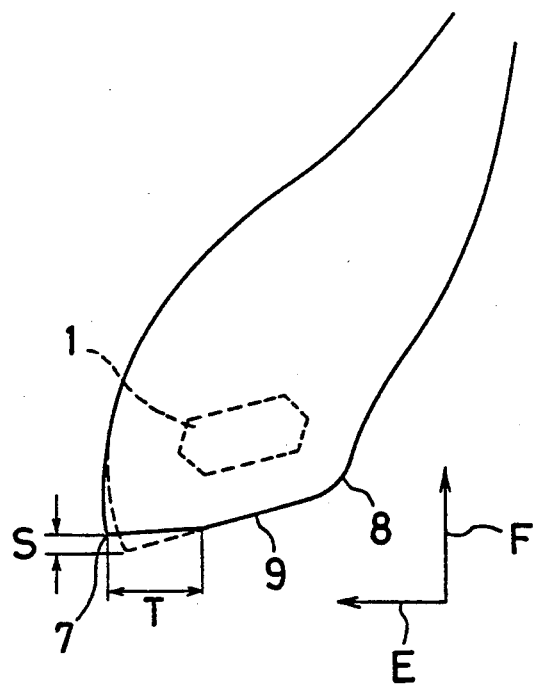

These tires were each mounted on a 2.D.D type vehicle (10 ton) and travelled by 150000 km according to JATMA (conditions: 700 kgf/cm² and 2500 kg). Thereafter, the tires were removed from the vehicle, and the amount (mm) of deformation after travelling was measured in comparison with the shape of the bead toe portion of the initial state according to a method shown in FIG. 5(C).

Air injection property during rim assembling was evaluated by removing the tire from the rim, conducting rim assembling again, and examining the relative difficulty of the air injection. In this case, when a single worker could inject air into all the tires of the same specifications used for the evaluation without use of a special jig for sealing the tire bead portion, these tires were evaluated as "o". In several tires having the same structure, when some tires were evaluated as "o" and the other tires were evaluated as "X", these tires were collectively evaluated as "Δ". When a single worker could not inject air in the above-described method and used a jig for sealing the bead portion for air injection, the tire was evaluated as "X".

The uniform fit of the tire into a rim was expressed in terms of the amount of the variation in the space between the rim flange and the tire rim check line over the entire periphery of the tire when the tire was filled with air of the maximum pressure as stipulated by JATMA.

The tire after travelling was finally cut to examine the occurrence of the separation of the turn-up edge of the carcass layer. When the occurrence of the separation was observed, the tire was subjected to measurement of the maximum crack length.

The results are shown in Table 1.

TABLE 1

| | After Travel of 150000 km in Actual Vehicle | | | | |
|---|---|---|---|---|---|
| | Amount of Deformation of Bead Toe Portion | | Air Injection Property | Fit into Rim | Separation |
| | S | T | | | |
| Conventional Tire A | 6.5 | 11.0 | X | 2.1 mm | 3 mm |
| Conventional Tire B | 4.0 | 8.5 | Δ | 1.4 mm | 2 mm |
| Comparative Tire A | 5.0 | 8.0 | X | 1.3 mm | 3 mm |
| Comparative Tire B | 4.0 | 7.0 | Δ | 1.0 mm | 2 mm |
| Tire of the Present Invention | 1.0 | 3.0 | o | 0.5 mm | free |

As is apparent from Table 1, the tire of the present invention has sufficiently improved rigidity in the bead core on the bead toe portion side and therefore exhibits not only a satisfactory effect of suppressing the deformation of the bead toe portion but also an effect of improving the air injection property during rim assembling and the uniform fit into the rim during rim re-assembling and preventing the occurrence of the separation of the turn-up edge of the carcass layer.

As described above, specifying the contour of the bead core in the tire of the present invention enables suppression of the deformation of the bead toe portion after a long-term use, prevention of a lowering in the hermetic sealing state, improvement in the air injection property during rim assembling, maintenance of the uniform fit of the tire into a rim, and prevention of the separation of the turn-up edge of the carcass layer.

What is claimed is:

1. A pneumatic radial tire having a circular bead core, wherein said bead core has substantially a polygonal cross section comprising a base (a) adjacent an inclined bead base portion of said tire, an inner side (b) on a side of said bead core nearest a bead toe portion of said tire, an outer side (d) on a side of said bead core nearest a bead heel portion of said tire, and a top side (c) opposite said base (a) and joining said inner side (b) and said outer side (d), an inclination $\theta_1$ of said base (a) relative to the axial direction of the tire is substantially the same as that of said bead base portion relative to the axial direction of the tire, a cross angle $\beta$ between said base (a) and said inner side (b) is 70° to 90°, an inclination $\theta_2$ of said top side (c) relative to the axial direction of the tire is smaller than said inclination $\theta_1$ and the direction of inclination of said top side (c) is opposite to that of said base (a).

2. A pneumatic tire according to claim 1, wherein said inner side (b) on a side of said bead core nearest a bead toe portion of said tire is a straight line or a curve.

3. A pneumatic tire according to claim 1, wherein the inclination $\theta_1$ is 13° to 18°.

4. A pneumatic tire according to claim 1, wherein the inclination $\theta_2$ is 2° to 10°.

5. A pneumatic tire according to claim 1, wherein said bead core is comprised of a plurality of bead wires and each of said bead wires is circular or quadrangular in section.

* * * * *